United States Patent Office 3,376,362
Patented Apr. 2, 1968

3,376,362
CARBOXYLATION OF HYDROCARBON RESINS
Roby Bearden, Jr. and Lloyd Albert Pine, Baton Rouge, La., assignors to Esso Research and Engineering Company, a corporation of Delaware
No Drawing. Filed Apr. 13, 1965, Ser. No. 447,885
12 Claims. (Cl. 260—888)

ABSTRACT OF THE DISCLOSURE

Petroleum resins are made to compete with natural rosin by reaction with carbon monoxide in presence of a Lewis acid catalyst such as Koch acid ($H_3PO_4 \cdot BF_3 \cdot H_2O$) in which the $H_3PO_4:BF_3$ molar ratio is between 0.8:1.2 and 1.2:0.8 and the water content of between 5 and 11% by weight).

---

This invention relates to the preparation of resinous carboxyl-containing materials.

Various types of unsaturated hydrocarbon resins are known in the art. For example, resins can be prepared by polymerizing steam-cracked petroleum fractions containing olefins and diolefins with Friedel-Crafts catalysts or by polymerizing conjugated diolefins with alkali metal catalysts; and by polymerizing olefinic compounds contained in cracked petroleum fractions with adsorptive clay. These resins find use in a variety of situations. For example, they may be used in floor tile, as coating compositions and as binders in sand cores and the like. These resins, however, are not suitable for use as paper sizes, wood binding and ink formulations and therefore cannot compete with natural rosin in this respect. This failure is due to lack of functionality on the basic hydrocarbon backbone.

In accordance with this invention it has been discovered that the above disadvantages can be overcome and the resins made suitable for uses which will compete with natural rosin by reacting the resin with carbon monoxide in the presence of a liquid highly acidic inorganic catalyst.

One of the base resins which can be carboxylated in accordance with the present invention is prepared from certain unsaturated petroleum refinery streams which contain various mixtures of acyclic and cyclic olefins and diolefins by contact with a Friedel-Crafts type catalyst under relatively low temperatures, e.g. —150° to +200° F. The hydrocarbon mixtures obtained by steam cracking petroleum oils have been found to be especially useful for this purpose. These distillates are prepared by cracking petroleum fractions such as kerosene, gas oil, naphtha or residua in the presence of large amounts of steam, e.g. 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture and the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table:

TABLE I.—STEAM CRACKED NAPHTHA FRACTION BOILING BETWEEN 10° AND 230° C.

| Component | Approximate Boiling Range, °C. | Specific Example, Volume Percent | General Range (15-70° C.), Volume Percent |
|---|---|---|---|
| $C^5$ Fraction | 10 to 65 | 31 | 10 to 40 |
| $C^6$–$C^8$ Fraction | 65 to 150 | 64 | 30 to 70 |
| $C^9$–$C^{12}$ Fraction | 150 to 230 | 5 | 0 to 25 |

Although the actual content of various chemical classes of hydrocarbons present may vary somewhat according to the type of crude oil from which the gas-oil fraction is being cracked and according to the steam cracking conditions and fractionating conditions, nevertheless, in general, a desirable essentially debutanized, steam-cracked naphtha fraction boiling between 10° and 230° C. will have approximately the following range in composition.

| | Percent by weight |
|---|---|
| Aromatic hydrocarbons | 10 to 50 |
| Olefins and diolefins | 30 to 70 |
| Unreactive paraffins | 0 to 5 |

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of mono-olefins and about 0 to 5 weight percent unreactive paraffins.

This fraction may be subjected as it is to polymerization in the presence of a Friedel-Crafts catalyst, such as $AlCl_3$, $BF_3$, $SnCl_4$, $TiCl_4$, $AlBr_3$, etc., at a temperature of about —150° F. to +200° F., preferably 70 to 130° F.

The reaction product is quenched, washed and stripped to give the final resin product. For example, the reaction mixture may be washed with alkali or water, quenched with dilute sulfuric or phosphoric acid and stripped to remove low boiling polymer. The typical product is a resin which has an average color of 9–10 Gardner and a softening point (ring and ball) of at least 100° C., a specific gravity at 25/25° C. of 0.97, a flash point (C.O.C.) of 260° C., a fire point of 270° C., an acid number of 1, a saponification number of 2, ash (wt. percent) 0.2, bromine number of 8, average molecular weight of 1,100 and contains two double bonds per molecule on the average.

Another base resin which can be carboxylated in accordance with this invention is the polymer obtained by contacting with clay a highly olefinic hydrocarbon stream described below. Such polymer (known as CTLA polymer) is prepared commercially in a clay treating unit which consists of a furnace having two individual circuits, one of which is used to preheat the feed and the other to supply heat to the fractionating tower which separates the polymer from light and heavy naphtha, and a drum charged with about 20 tons of 8 to 15 mesh attapulgus clay. The highly olefinic feed stream consists of a mixture of depentanized distillate from an isoprene fractionator unit and debutanized bottoms from a steam cracking unit. It boils between about 10 to 260° C. and contains about 10 to 25 wt. percent conjugated diolefins, 40 to 60 wt. percent olefins, 20 to 40 wt. percent aromatic and 2 to 5 wt. percent paraffin hydrocarbons. The liquid feed stream is generally preheated to about 250° to 300° F. and passed downwardly through the clay drum. A temperature rise of about 30° to 50° F. occurs in the clay bed as a result of the exothermic reaction. The treated distillate leaving the clay drum is transferred to a fractionating tower which separates the polymer from light and heavy naphtha. A stripper in the bottom of the tower removes any light hydrocarbons that may be mixed with the polymer. The general properties of clay tower polymers are shown in the following tabulation:

|  | Total Clay Tower Polymer | Normally Solid Fractions of Clay Tower Polymer |
| --- | --- | --- |
| Gravity, API at 60° F | 10-40 |  |
| Nonvolatile Content, percent [1] | 60-90 | 100 |
| Iodine Number (Wijs) [2] | 190-250 | 190-300 |
| Viscosity at 100° F. SUS [3] | 200-11,000 |  |
| Viscosity at 200° F. SUS [3] | 40-150 |  |
| Flash Point, ° F. [4] | 185-325 |  |
| Fire Point, ° F. [4] | 205-345 |  |
| Pour Point, ° F. [5] | -20-60 |  |
| Softening Point [6] |  | 140-250 |

[1] Percent nonvolatiles as measured at 225° F. for a duration of three hours.
[2] Grams iodine that will react with 100 grams of sample.
[3] ASTM designation 446-39.
[4] ASTM designation D92-45.
[5] ASTM designation D-97.
[6] ASTM designation D36-26.

Still other base resins which can be used are the mixture of the petroleum resins above described and the liquid diolefin polymers prepared by polymerizing acyclic conjugated diolefins of 4 to 6 carbon atoms and copolymers consisting of 25 to 100 parts by weight of said diolefin and 0 to 75 parts by weight of an ethylenically unsaturated monomer. Suitable diolefins include butadiene, isoprene, dimethyl butadiene, piperylene, and methyl pentadiene. The ethylenically unsaturated comonomers include styrene, acrylonitrile, methyl vinyl ketone and ring-substituted styrenes such as paramethyl styrene, dimethyl styrene, etc. These polymers may be prepared by several known methods, i.e. (1) by emulsion polymerization as described in U.S. Patent No. 2,500,983 to Frolich; (2) by solution polymerization as described in U.S. Patent No. 2,586,594 to Gleason; (3) by peroxide polymerization as described in U.S. Patent No. 2,581,094 to Gleason et al.; or by solution polymerization with an alkali metal catalyst as described in U.S. Patent No. 2,762,851 to Gleason and U.S. Patent No. 2,849,510 to Jaros et al.

A particularly desirable polymer suitable for mixing with petroleum resins and carboxylating in accordance with the present invention is the product obtained by sodium copolymerization of butadiene and styrene as described in U.S. Patent No. 2,849,510. This product is a solution of polymer in a suitable hydrocarbon solvent such as solvent naphtha or mineral spirits. In appearance it is a clear, colorless to light yellow oily composition and has a viscosity of about 0.15 to 22 poises at 50% N.V.M. Further details concerning the preparation of these polymers may be had by consulting the patents mentioned above, the subject matter of which is incorporated herein by reference. The amount of liquid diolefin polymer used in the mixture will range from 5 to 15 wt. percent based on the total resin mixture.

Whichever of the base resin is chosen, it is dissolved in a hydrocarbon solvent and reacted with a carbon monoxide gas in the presence of a liquid, highly acidic inorganic compound as a catalyst under constant agitation. The reaction temperature is not critical and may vary from −10 to +150° C. Any Lewis acid may be used as the catalyst. A particularly effective catalyst is the complex of boron trifluoride with phosphoric acid. A small amount of water should be present with these catalysts. The carbon monoxide is present in molar excess and the reaction is continued at a pressure of 500 to 1500 p.s.i.g. until the absorption of carbon monoxide ceases.

With the use of liquid complex mixtures of phosphoric acid, boron trifluoride and water, in which the $H_3PO_4:BF_3$ molar ratio is between 0.8:1.2 and 1.2:0.8, depending on the olefin, a water content of between 5 and 11% by weight (based on the sum of $H_3PO_4:BF_3$ and $H_2O$ present in the reaction zone) and a temperature between 40° C. and 80° C. are generally preferred. If higher or lower ratios of $H_3PO_4:BF_3$ are used it is preferable to apply a lower or a higher water content respectively.

The carboxylated resins produced by the above process have the following properties.

| | |
| --- | --- |
| Softening point measured by the ring and ball method, °C. | 50 to 150 |
| Average molecular weight | 500 to 1700 |
| Specific gravity with respect to a Sp. Gr. of water of one measured at 25° C. | .98 to 1.02 |
| A carbon to hydrogen weight ratio | 5.7 to 5.9 |
| Oxygen content, weight percent | 1 to 4.0 |

To illustrate the mode of operating according to the process of this invention, the following detailed examples are given.

Example 1

A mixture of 80 grams of CTLA liquid overhead polymer, B.P. 450–1000° F. and 320 grams of n-heptane was charged to a Paar autoclave and heated up to 70° C. Then with the stirrer off, 50 grams of catalyst

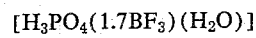

$$[H_3PO_4(1.7BF_3)(H_2O)]$$

was added and the autoclave pressure was raised to 1000 p.s.i.g. with carbon monoxide. The stirrer was started and the reaction—mildly exothermic at first—was allowed to proceed until CO gas uptake had ceased. After 120 minutes, pressure held constant with a total of 100 p.s.i.g. carbon monoxide absorbed. The autoclave was then vented and flushed repeatedly with nitrogen. Addition of water to the reactor contents did not cause any visible change and it was necessary finally to add small portions of isopropyl alcohol to bring about hydrolysis (possibly alcoholysis) of the resin-catalyst and unreacted catalyst. Successive washes with water-isopropyl alcohol mixtures were employed to remove catalyst residues. The product was recovered by stripping away light hydrocarbon to a maximum pot temperature of 150° C. at 5 mm. for fifteen minutes. There was recovered 69 grams of deep red resin having a softening point of about 60° C. and a molecular weight 548 and containing 3.77 wt. percent oxygen. In addition there was recovered 10 grams of light colored polymeric oil, B.P. 100 to 146° C. (5 mm.).

Example 2

In exactly the same manner as described in Example 1, 80 grams of CTLA "total" polymer was used in the synthesis. Again, some 100 p.s.i.g. of carbon monoxide was taken up. There was recovered 75 grams of solid resin product, S.P. ca. 110° C., which analyzed for 2.5 wt. percent oxygen.

Example 3

A resin was prepared by steam-cracking a gas oil petroleum fraction derived from a paraffinic type crude at a temperature of about 1300 to 1450° F. and pressure of 5 to 20 p.s.i.g. in the presence of about 70 to 80 mol percent of steam and then polymerizing the cracked fraction.

The approximate analysis of the steam-cracked fraction, after debutanizing, was as follows:

| | Volume percent |
|---|---|
| $C_5$ cyclodiolefins | 5 |
| Aliphatic $C_5$ diolefins | 5 |
| $C_5$ olefins | 20–21 |
| $C_6$–$C_8$ diolefins | 8–10 |
| $C_6$–$C_8$ olefins | 14–15 |
| $C_9$–$C_{12}$ diolefins | 3 |
| $C_9$–$C_{12}$ olefins | 4 |
| Benzene | 15 |
| Toluene | 10 |
| Xylenes | 2–3 |
| $C_9$–$C_{12}$ aromatics | 5–6 |
| Paraffins | 3 |

The above steam-cracked fraction was subjected to heat soaking and distillation to remove pentenes, isoprene, and cyclodienes to produce a feedstock with this approximate analysis:

| | Volume percent |
|---|---|
| Pentenes | 4 |
| Isoprene | 2 |
| Piperylenes | 8 |
| Acetylenes | 1 |
| Cyclodienes | 2 |
| Benzene | 40 |
| Toluene | 10 |
| $C_6$–$C_8$ diolefins | 13 |
| $C_6$–$C_8$ olefins | 20 |

The product was then polymerized in a continuous flow unit at a temperature of 90 to 130° F. for a reactor residence time of about one half hour with about 1 weight percent $AlCl_3$ catalyst based on feed. From the reactor the resin stream was passed into a "drowning drum" where the catalyst was decomposed with water and steam at approximately 200° F. The aqueous phase was allowed to separate and the resin stream was then subjected to several washing cycles at elevated temperature and pressure to further remove inorganic residues. From a settler the stream was fed into a furnace and flash tower to remove unreacted feed components. The final product emerging from the stripping operation possessed a 30–40° C. softening point and contained 90–92% solid resin.

This resin was stripped of polymeric oils by heating to a maximum bottoms temperature of 390–420° F. at 5–10 mm. Hg for at least one hour. Analyses for the resultant resin were: softening point 107° C., molecular weight (osmometer) 1963, and oxygen content, 0.04 wt. percent.

Example 4

Five hundred and ten grams of the feed used in Example 3, i.e. after the heat soaking step to remove pentenes, isoprene and cyclodienes, was mixed with 29 grams of a commercial liquid polybutadiene—styrene copolymer—which exhibited the following physical properties:

| | |
|---|---|
| Nonvolatile matter, wt. percent | 100 |
| Sp. Gr. 20/4° C. | 0.915 |
| Viscosity, poise | 0.9–1.2 |
| Color, Gardner, max. | [1] 1 |
| Flash point (tag open cup), ° F. | >200 |
| Molecular weight | 2500–3500 |
| Approximate composition, wt. percent | |
| Butadiene, percent | 80 |
| Styrene, percent | 20 |

[1] At 50% N.V.M. in Varsol. Viscosity at 100% N.V.M. is approximately 3000–3600 poise.

The mixture was then polymerized in a batch reaction with 5.39 grams (1 wt. percent) of anhydrous aluminum chloride at 40° C. for one hours. The catalyst was then decomposed by treating with 400 ml. of a 3:1 mixture (by volume) of water to isopropyl alcohol. Catalyst residues were further removed by successive hot water washes. Solid resin was recovered by distilling away unreacted resin feed and then stripping the residue at 210° C. and 5 mm. for one hour. There was obtained 176 grams of a yellow resin, S.P. 88° C., and molecular weight 2061 (by vapor pressure osmometer).

According to the procedure described in Example 1, 60 grams of this resin, together with 300 grams of n-heptane, was reacted with 50 grams of the catalyst of Example 1 and 1000 p.s.i.g. of carbon monoxide. The reaction appeared complete after ninety minutes with a gas uptake of ca. 60 p.s.i.g. There was recovered 54 grams of resin, S.P. 130° C., which analyzed for 1.84 wt. percent oxygen.

Example 5

80 grams of the resin of Example 3 was reacted with 28 grams of the catalyst of Example 1 and 1000 p.s.i.g. of carbon monoxide, according to the procedure described in Example 1. The product, 79 grams, had a softening point of 141° C., M.W. of 1602 and analyzed for 1.16 wt. percent oxygen.

The above examples show that carbon monoxide can be reacted with hydrocarbon resins to introduce functional groups into the resin whereby the commercial uses of the polymer can be diversified. For example, the improved resins are suitable for use in paper sizings, for paints, inks, linoleum, soldering compounds, core oils, insulating compounds, molding compounds, sealing waxes, soaps, emulsifiers, varnishes, etc.

The nature of the present invention having been fully set forth and specific examples of the same given, what is claimed as new and useful and desired to be secured by Letters Patent is:

1. A resin consisting essentially of the reaction product of carbon monoxide and a polymer chosen from the group consisting of:

(a) a Friedel-Crafts polymer of a steam-cracked naphtha fraction boiling between 10 and 230° C. and having the following composition:

| | Parts by Wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 |

(b) a clay polymer of an olefinic stream boiling between 10 and 260° C. and having the following composition:

| | Wt. percent |
|---|---|
| Conjugated diolefins | 10–25 |
| Olefins | 40–60 |
| Aromatic hydrocarbons | 20–40 |
| Paraffin hydrocarbons | 2–5 |

(c) a mixture of (a) and 5 to 15 wt. percent of a polymer of 25 to 100 parts by weight of a $C_4$ to $C_6$ conjugated diolefin with 0 to 75 parts by weight of an ethylenically unsaturated monomer, said resin having the following properties:

| | |
|---|---|
| Softening point measured by ring and ball method, ° C. | 50–150 |
| Average molecular weight | 500–1700 |
| Specific gravity with respect to water at 25° C. | 0.98–1.02 |
| A carbon to hydrogen ratio | 5.7–5.9 |
| Oxygen content, wt. percent | 1–4.0 |

2. A carboxylated resin consisting essentially of the reaction product of carbon monoxide and a Friedel-Crafts polymer of a stem-cracked naphtha fraction boiling between about 10 and 230° C. and having the following composition:

| | Parts by Wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | said carboxylated resin having the following properties:

| | |
|---|---|
| Softening point measured by ring and ball method, ° C. | 50–150 |
| Average molecular weight | 500–1700 |
| Specific gravity with respect to water at 25° C. | 0.98–1.02 |
| A carbon to hydrogen ratio | 5.7–5.9 |
| Oxygen content, wt. percent | 1–4.0 |

3. A resin consisting essentially of the reaction product of carbon monoxide and a clay polymer of an olefinic stream boiling between 10 and 260° C. and having the following composition:

| | Wt. percent |
|---|---|
| Conjugated diolefins | 10–25 |
| Olefins | 40–60 |
| Aromatic hydrocarbons | 20–40 |
| Paraffin hydrocarbons | 2–5 | said resin having the following properties:

| | |
|---|---|
| Softening point measured by ring and ball method, ° C. | 50–150 |
| Average molecular weight | 500–1700 |
| Specific gravity with respect to water at 25° C. | 0.98–1.02 |
| A carbon to hydrogen ratio | 5.7–5.9 |
| Oxygen content, wt. percent | 1–4.0 |

4. A resin consisting essentially of the reaction product of carbon monoxide and a polymer obtained by reacting in the presence of a Friedel-Crafts catalyst a steam-cracked naphtha fraction boiling between 10 and 230° C. and having the following composition:

| | Parts by Wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | with 5 to 15 wt. percent of a copolymer of 80 wt. percent butadiene and 20 wt. percent styrene, said resin having the following properties:

| | |
|---|---|
| Softening point measured by ring and ball method, ° C. | 50–150 |
| Average molecular weight | 500–1700 |
| Specific gravity with respect to water at 25° C. | 0.98–1.02 |
| A carbon to hydrogen ratio | 5.7–5.9 |
| Oxygen content, wt. percent | 1–4.0 |

5. The process of claim 12 in which the catalyst is a complex mixture of phosphoric acid and water, the molar ratio is $H_3PO_4$ to $BF_3$ being between 0.8 to 1.2 and 1.2 to 0.8, the water content being between 5 and 11% by weight based on the sum of $H_3PO_4$, $BF_3$ and water present in the reaction zone.

6. The process of claim 12 in which the polymer is a Friedel-Crafts polymer of a steam-cracked naphtha fraction boiling between 10 and 230° C. and having the following composition:

| | Parts by wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 |

7. The process of claim 10 in which the catalyst is a complex mixture of phosphoric acid and water, the molar ratio of $H_3PO_4$ to $BF_3$ being between 0.8 to 1.2 and 1.2 to 0.8, the water content being between 5 and 11% by weight based on the sum of $H_3PO_4$, $BF_3$ and water present in the reaction zone.

8. The process of claim 12 in which the polymer is a clay polymer of an olefinic stream boiling between 10 and 260° C. and having the following composition:

| | Wt. percent |
|---|---|
| Conjugated diolefins | 10–25 |
| Olefins | 40–60 |
| Aromatic hydrocarbons | 20–40 |
| Paraffin hydrocarbons | 2–5 |

9. The process of claim 8 in which the catalyst is a complex mixture of phosphoric acid and water, the molar ratio of $H_3PO_4$ to $BF_3$ being between 0.8 to 1.2 and 1.2 to 0.8, the water content being between 5 and 11% by weight based on the sum of $H_3PO_4$, $BF_3$ and water present in the reaction zone.

10. The process of claim 5 in which the polymer is obtained by reacting in the presence of a Friedel-Crafts catalyst a steam-cracked naphtha fraction boiling between 10 and 230° C. and having the following composition:

| | Parts by wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 | with 5 to 15 wt. percent of a copolymer of 80 wt. percent butadiene and 20 wt. percent styrene.

11. The process of claim 10 in which the catalyst is a complex mixture of phosphoric acid and water, the molar ratio of $H_3PO_4$ to $BF_3$ being between 0.8 to 1.2 and 1.2 to 0.8, the water content being between 5 and 11% by weight based on the sum of $H_3PO_4$, $BF_3$ and water present in the reaction zone.

12. A process for preparing a carboxylated resin which comprises reacting carbon monoxide at a temperature between −10 and +150° C. and at a pressure between 500 and 1500 p.s.i.g. in the presence of a Lewis acid catalyst, with an unsaturated polymer chosen from the group consisting of:

(a) a Friedel-Crafts polymer of a steam-cracked naphtha fraction boiling between 10 and 230° C. and having the following composition:

| | Parts by wt. |
|---|---|
| Benzene | 5–20 |
| Toluene | 5–15 |
| $C_9$–$C_{12}$ aromatic hydrocarbons | 0–25 |
| Cyclic diolefins | 5–15 |
| Aliphatic diolefins | 10–15 |
| Aliphatic mono-olefins | 15–60 |
| Paraffins | 0–5 |

(b) a clay polymer of an olefinic stream boiling between 10 and 260° C. and having the following composition:

|  | Wt. percent |
|---|---|
| Conjugated diolefins | 10–25 |
| Olefins | 40–60 |
| Aromatic hydrocarbons | 20–40 |
| Paraffin hydrocarbons | 2–5 |

(c) a mixture of (a) and 5 to 15 wt. percent of a polymer of 25 to 100 parts by weight of a $C_4$ to $C_6$ conjugated diolefin with 0 to 75 parts by weight of an ethylenically unsaturated monomer.

References Cited
UNITED STATES PATENTS 2,544,555  3/1951  Jones et al. ‒‒‒‒‒‒‒‒‒‒ 260—82

MURRAY TILLMAN, *Primary Examiner.*

D. J. BREZNER, M. J. TULLY, *Assistant Examiners.*